US009576467B2

(12) United States Patent  
Matsumasa et al.

(10) Patent No.: US 9,576,467 B2
(45) Date of Patent: Feb. 21, 2017

(54) EMERGENCY DETECTION DEVICE, EMERGENCY DETECTION SYSTEM, RECORDING MEDIUM, AND METHOD THEREFOR

(71) Applicant: FUJIFILM Corporation, Tokyo (JP)

(72) Inventors: Hironori Matsumasa, Tokyo (JP); Satoshi Ueda, Tokyo (JP); Yuya Kudo, Tokyo (JP); Yasunori Ohta, Tokyo (JP); Ryosuke Usami, Tokyo (JP); Takamasa Yaguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/836,920

(22) Filed: Aug. 26, 2015

(65) Prior Publication Data

US 2016/0078748 A1    Mar. 17, 2016

(30) Foreign Application Priority Data

Sep. 17, 2014   (JP) ................. 2014-188477

(51) Int. Cl.
*G08B 1/08*      (2006.01)
*G08B 25/01*     (2006.01)
(Continued)

(52) U.S. Cl.
CPC ........... *G08B 25/016* (2013.01); *G08B 25/003* (2013.01); *H04W 4/22* (2013.01); *G08B 21/043* (2013.01); *G08B 29/185* (2013.01); *G08B 31/00* (2013.01)

(58) Field of Classification Search
CPC ..... G08B 21/10; G08B 25/003; G08B 25/016; G01S 5/0221; H04W 4/22; H04W 8/005
(Continued)

(56) References Cited

U.S. PATENT DOCUMENTS

| | | | | |
|---|---|---|---|---|
| 5,963,130 | A * | 10/1999 | Schlager | G08B 25/016 340/540 |
| 9,226,259 | B2 * | 12/2015 | Noonan | H04W 4/22 |
| 2007/0044539 | A1 * | 3/2007 | Sabol | G08B 21/10 340/540 |

FOREIGN PATENT DOCUMENTS

| | | |
|---|---|---|
| JP | H06266840 | 9/1994 |
| JP | 2007028680 | 2/2007 |

(Continued)

OTHER PUBLICATIONS

"Office Action of Japan Counterpart Application," issued on Oct. 26, 2016, with English translation thereof, p. 1-p. 8, in which the listed references were cited.

*Primary Examiner* — John A Tweel, Jr.
(74) *Attorney, Agent, or Firm* — Jianq Chyun IP Office

(57) ABSTRACT

The emergency detection system includes a position information acquisition section, a presumption section, a determination section, and a notification section. The position information acquisition section acquires position information that indicates temporal changes of current positions of a plurality of portable terminals obtained using a GPS. The presumption section presumes a point of emergency occurrence on the basis of the position information acquired by the position information acquisition section. The determination section examines whether or not the point presumed by the presumption section corresponds to an exclusion area, and determines that the point presumed by the presumption section is the point of the emergency occurrence in the case where the point does not correspond to the exclusion area. The notification section notifies the point of the emergency occurrence, which is determined by the determination section, to terminals at a preset destination of the notification.

20 Claims, 13 Drawing Sheets

(51) Int. Cl.
*H04W 4/22* (2009.01)
*G08B 25/00* (2006.01)
G08B 21/04 (2006.01)
G08B 29/18 (2006.01)
G08B 31/00 (2006.01)

(58) Field of Classification Search
USPC .................. 340/539.11, 540; 342/357.27
See application file for complete search history.

(56) References Cited

FOREIGN PATENT DOCUMENTS

| | | |
|---|---|---|
| JP | 2009098205 | 5/2009 |
| JP | 5271227 | 8/2013 |

* cited by examiner

EMERGENCY DETECTION DEVICE, EMERGENCY DETECTION SYSTEM, RECORDING MEDIUM, AND METHOD THEREFOR

CROSS-REFERENCE TO RELATED APPLICATIONS

The present application claims priority under 35 U.S.C. §119 to Japanese Patent Application No. 2014-188477, filed on Sep. 17, 2014. The above application(s) is hereby expressly incorporated by reference, in its entirety, into the present application.

BACKGROUND OF THE INVENTION

1. Field of the Invention

The present invention relates to an emergency detection device, an emergency detection system, a recording medium, and a method for detecting emergency.

2. Description of the Related Art

Emergency detection systems using a plurality of surveillance cameras, which are provided in a street, have been known (for example, refer to JP5271227B to be described later). Here, the emergency means, for example, a situation where a human body is exposed to danger and some sort of urgent handling is necessary. Examples of the situation include a situation where a person suddenly falls down in a street, an accident causing injury or death, and an incident where a person is in danger.

In an emergency detection system described in JP5271227B, by analyzing images photographed by the surveillance cameras, movement situations of people are detected. In the case where a situation where destinations of movements of a plurality of persons are concentrated is detected, it is detected that a certain emergency occurred in the situation. Then, on the basis of positions of the surveillance cameras which are registered in advance, an emergency occurrence point, at which it is detected that the emergency occurred, is determined, and is notified to a presumed destination of the notification.

SUMMARY OF THE INVENTION

However, in JP5271227B mentioned above, the surveillance cameras are used to detect the movement situation of people. Hence, monitoring is not possible at locations of blind spots of the surveillance cameras or at locations where the surveillance cameras are not provided, and thus there is a problem in that coverage of a monitoring area is small. In order to improve the coverage of the monitoring area, the number of surveillance cameras provided should be increased. However, this method is not realistic and is less effective in terms of costs and difficulty in securing places where the cameras are provided.

There is a concern about a problem that, as the coverage of the monitoring area is improved, there are increases in a frequency of false detection and a frequency of excess detection. The false detection means that, although there is no emergency, an emergency is nevertheless detected. The excess detection means that an emergency is detected at a location where it is not so necessary to determine whether the current situation is an emergency.

The present invention has an object to provide an emergency detection device, an emergency detection system, a recording medium, and a method capable of improving the coverage of the monitoring area while preventing false detection and excess detection.

In order to achieve the above-mentioned object, there is provided an emergency detection device including: a position information acquisition section that communicates with a plurality of portable terminals, which detect position information on the basis of radio waves sent from a GPS satellite, and acquires the position information of the plurality of portable terminals; a presumption section that presumes occurrence of an emergency on the basis of at least one of movement situations or stop situations of the plurality of portable terminals, the situations being detected from the position information of the plurality of portable terminals; and a determination section that examines whether or not a point of the occurrence of the emergency presumed by the presumption section corresponds to an exclusion area which is preset and that determines that the emergency occurs at the point of the occurrence in the case where the point of the occurrence does not correspond to the exclusion area.

The presumption section may presume that the emergency occurs at destinations of movements of the portable terminals, of which the number is greater than a predetermined number, in the case where the presumption section detects, as the movement situation, a situation where the destinations of the movements are concentrated to the same point.

The presumption section may presume that the emergency occurs at the destinations of the movements in the case where the presumption section detects change from a situation where the portable terminals of which the number is greater than the predetermined number respectively move in a plurality of directions to a situation where the directions are concurrently changed at a certain time point and the portable terminals start moving toward the destinations of the movements.

The presumption section may presume that the emergency occurs at the destinations of the movements in the case where the presumption section detects continuance of a situation where the portable terminals of which the number is greater than the predetermined number are moving toward the destinations of the movements for a certain time period.

The presumption section may presume that the emergency occurs at a center point of a preset area in the case where the presumption section detects, as the stop situation, a situation where the portable terminals of which the number is greater than a preset number are stopping in the preset area for a time period longer than a preset time period.

At least one of police stations, fire stations, and medical facilities may be set as the exclusion area.

At least one of train stations, airports, government offices, disaster evacuation zones, and local public organizations may be set as the exclusion area.

A notification section may be included that notifies the point of the occurrence of the emergency to a preset destination of the notification.

At least one of a terminal accessed by a police official, a terminal accessed by a fire official, a terminal accessed by a medical service worker, a terminal accessed by a regional representative, and a terminal accessed by a volunteer staff who is registered in advance may be set as the destination of the notification.

The notification section may transfer a notification screen, on which the point of the occurrence of the emergency is marked on a map, to the destination of notification.

In order to achieve the above-mentioned object, there is provided an emergency detection system including: an emergency detection device that communicates with a plurality of portable terminals which detect position information on the basis of radio waves sent from a GPS satellite, in which the emergency detection device includes a position information acquisition section that communicates with the plurality of portable terminals, and acquires the position information of the plurality of portable terminals, a presumption section that presumes occurrence of an emergency on the basis of at least one of movement situations or stop situations of the plurality of portable terminals, the situations being detected from the position information of the plurality of portable terminals, and a determination section that examines whether or not a point of the occurrence of the emergency presumed by the presumption section corresponds to an exclusion area which is preset and that determines that the emergency occurs at the point of the occurrence in the case where the point of the occurrence does not correspond to the exclusion area.

In order to achieve the above-mentioned object, there is provided a non-transitory computer-readable recording medium that stores the emergency detection program according to the aspect of the present invention for functioning a computer as an emergency detection device, the emergency detection program causing the computer to execute functions of: communicating with a plurality of portable terminals, which detect position information on the basis of radio waves sent from a GPS satellite, and acquiring the position information of the plurality of portable terminals; presuming occurrence of an emergency on the basis of at least one of movement situations or stop situations of the plurality of portable terminals, the situations being detected from the position information of the plurality of portable terminals; and examining whether or not a point of the occurrence of the emergency presumed by the presuming corresponds to an exclusion area which is preset, and determining that the emergency occurs at the point of the occurrence in the case where the point of the occurrence does not correspond to the exclusion area.

In order to achieve the above-mentioned object, there is provided a method of detecting emergency by causing an emergency detection device to execute functions of: communicating with a plurality of portable terminals, which detect position information on the basis of radio waves sent from a GPS satellite, and acquiring the position information of the plurality of portable terminals; presuming occurrence of an emergency on the basis of at least one of movement situations or stop situations of the plurality of portable terminals, the situations being detected from the position information of the plurality of portable terminals; and examining whether or not a point of the occurrence of the emergency presumed by the presuming corresponds to an exclusion area which is preset, and determining that the emergency occurs at the point of the occurrence in the case where the point of the occurrence does not correspond to the exclusion area.

In the aspects of the present invention, the occurrence of the emergency is presumed on the basis of the position information of the plurality of portable terminals which are acquired using the global positioning system (GPS). In the case where the point of the occurrence of the emergency presumed does not correspond to the preset exclusion area, it is determined that the emergency occurs at the occurrence point. Therefore, it is possible to improve the coverage of the monitoring area while reducing noise.

DESCRIPTION OF THE PREFERRED EMBODIMENTS

Figure 1:
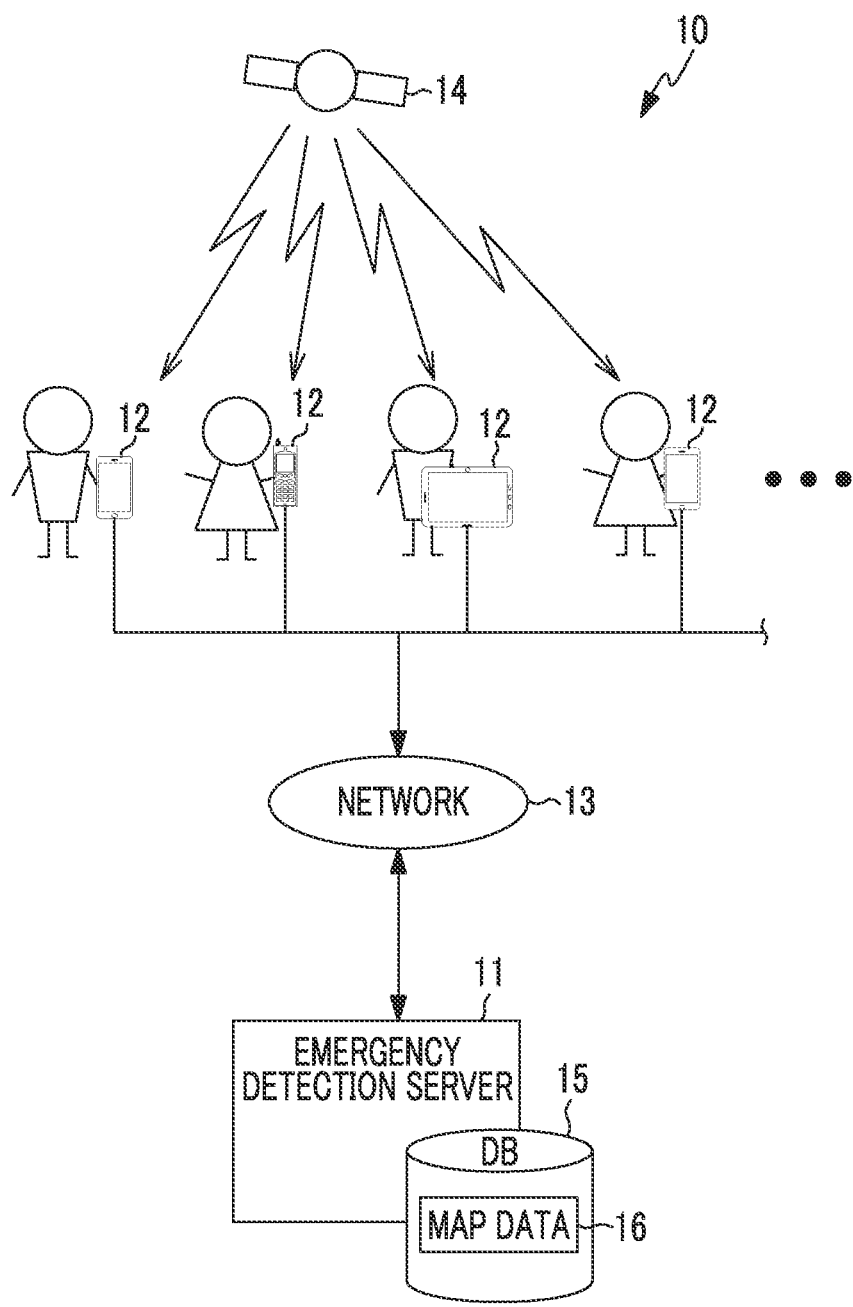
FIG. 1 is an explanatory diagram illustrating a configuration of an emergency detection system.

An emergency detection system 10 shown in FIG. 1 is a computer system for detecting an emergency. The emergency detection system 10 includes an emergency detection server 11, portable terminals 12, and a network 13 that connects the server and the terminal such that those are able to communicate with each other. The network 13 is, for example, the Internet.

The portable terminal 12 is a mobile phone, a smartphone, a tablet terminal, or the like that has a communication function and a position detection function using a GPS. The portable terminal 12 detects an own current position in real time on the basis of radio waves sent from a GPS satellite 14, and transmits the detected current position to the emergency detection server 11 through the network 13. The emergency detection system 10 continuously collects position information pieces of the portable terminals 12 from the portable terminals 12 of unspecified multiple users who allow providing information.

The emergency detection server 11 is an emergency detection device according to an embodiment of the present invention. The emergency detection device acquires the position information which is sent in real time from the plurality of portable terminals 12, and detects an emergency on the basis of at least one of movement situations or stop situations of the plurality of portable terminals 12 which are detected from the acquired position information. Here, the emergency means, for example, a situation where a human body is exposed to danger and some sort of urgent handling is necessary. Examples of the situation include a situation where a person suddenly falls down in a street, an accident causing injury or death, and an incident where a person is in danger.

Figure 2:
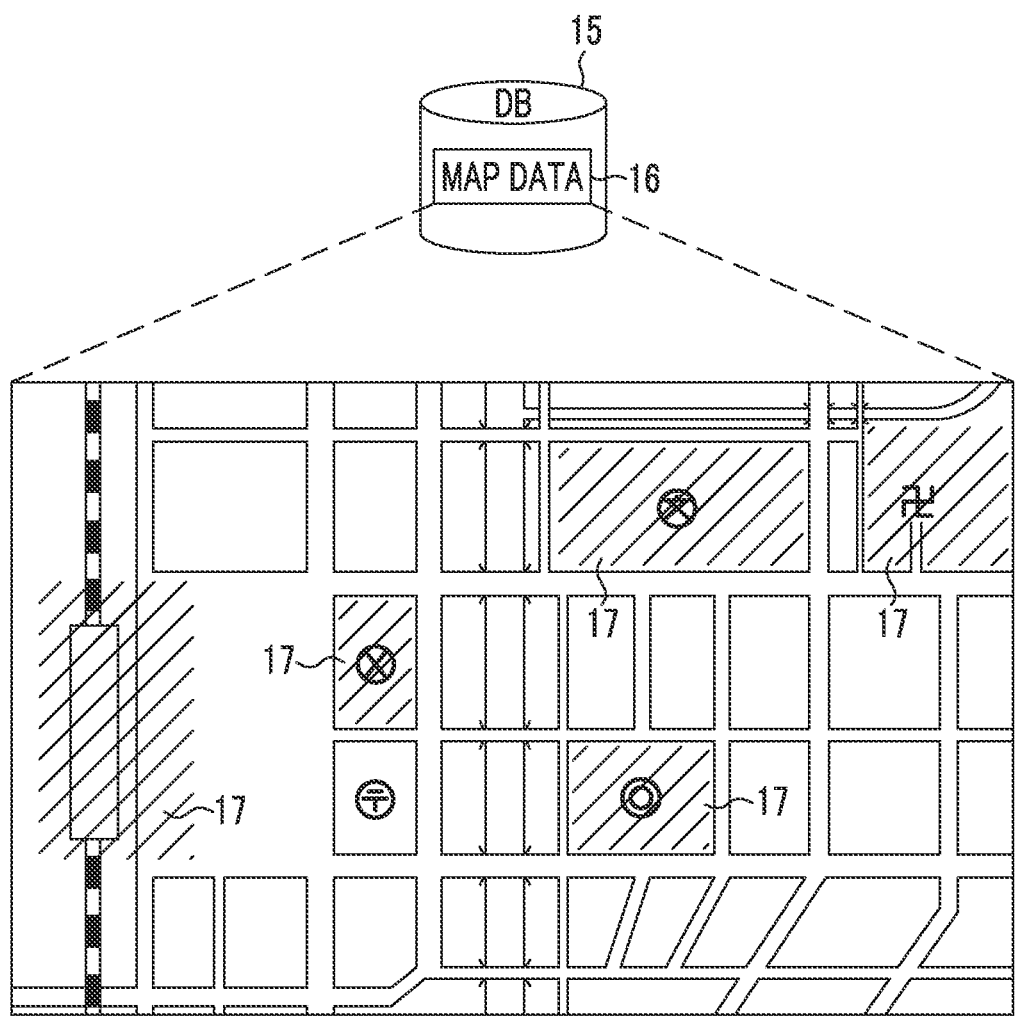
FIG. 2 is an explanatory diagram illustrating an example of map data.

The emergency detection server 11 has database (DB) 15, and as shown in FIG. 2, map data 16 corresponding to a monitoring area, which is covered by the emergency detection server 11, is stored in the DB 15. The monitoring area, for example, is an administrative district such as municipalities. It is apparent that the monitoring area may be a smaller area than the administrative district and may be enlarged to cover the whole of the country since the GPS is used. The emergency detection server 11 detects the emergency which occurs in the monitoring area. The map data 16 includes position information pieces corresponding to the respective points so as to cross-check the position information pieces with the position information pieces which are collected from the portable terminals 12.

In the map data 16, exclusion areas 17, which are hatched, are set. The exclusion area 17 is, as described later, an area which is set to prevent false detection and excess detection for emergency. The emergency detection server 11 presumes occurrence of the emergency from the position information of the plurality of portable terminals 12. In the case where the point of the occurrence of the emergency presumed corresponds to the exclusion area 17, it is determined that the occurrence of the emergency is based on false detection or excess detection. In contrast, in the case where the point of the occurrence of the emergency presumed does not correspond to the exclusion area 17, the emergency detection server 11 determines that the emergency occurs at the point of the presumed occurrence.

As the exclusion areas 17, for example, a train station, a police station, a school, a disaster evacuation zone (a temple in the example of FIG. 2), and a city hall are set. At a location such as a train station where people are concentrated even at normal times, people rapidly gather or scatter. In the case where an emergency is detected from the movement situations of the portable terminals 12 at such a location, the detection is highly likely to be false detection. At the train station, there are staff members, such as station staff, trained to cope with the emergency. Hence, it is not so necessary to detect the emergency. Since the police station or the like is a location where there are staff members having duty to cope with the emergency, as compared with a location on a road or the like, it is not so necessary to detect the emergency, and the detection is likely to be excess detection. As described above, the detection is likely to be false detection or excess detection, and an area where it is not so necessary to detect the emergency is set as the exclusion area 17.

The emergency detection server 11 is configured by installing control programs such as an operating system and application programs such as a server program on a computer such as a personal computer, a server computer, or a workstation as a base.

Figure 3:
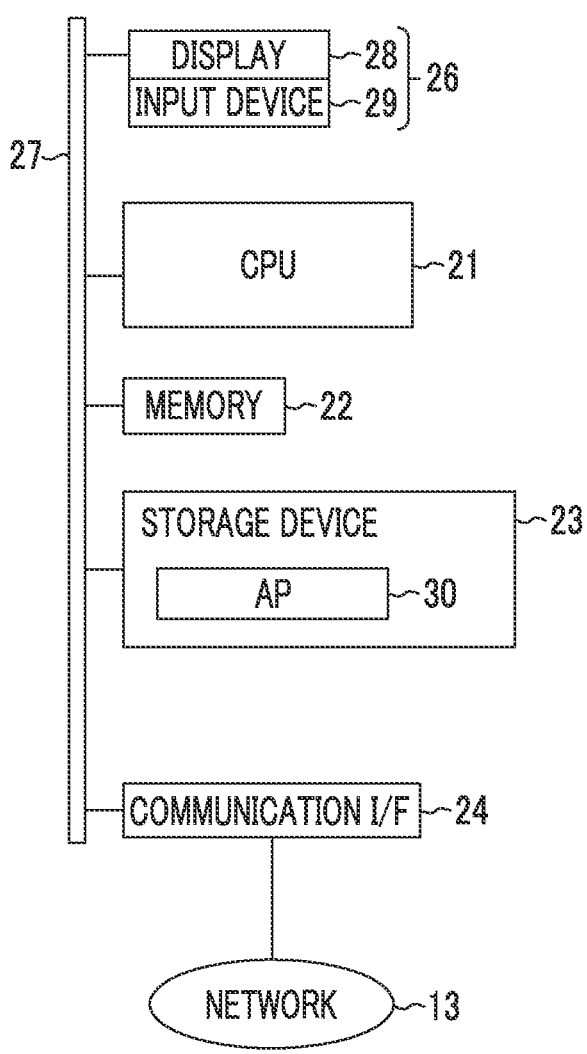
FIG. 3 is a block diagram illustrating an electrical configuration of a computer used in an emergency detection server.

As shown in FIG. 3, the computer constituting the emergency detection server 11 includes a central processing unit (CPU) 21, a memory 22, a storage device 23, a communication I/F 24, and an input/output section 26. These elements are connected through a data bus 27. The input/output section 26 is formed of a display 28 and an input device 29 such as a keyboard and a mouse.

The storage device 23 is, for example, a hard disk drive (HDD), and stores the control programs and the application programs (hereinafter referred to as AP) 30. Further, in the emergency detection server 11 having the DB 15, for example, a disk array, in which a plurality of HDDs is arranged, is provided as the storage device 23 for DB separately from the HDD storing the programs. In addition, the disk array may be built into the server main body, and may be provided separately from the server main body so as to be connected to the server main body through a network such as a local area network (LAN).

The memory 22 is a work memory for CPU 21 to execute processes, and is formed as a random access memory (RAM). The CPU 21 loads the control programs, which are stored in the storage device 23, on the memory 22, and executes the processes based on the programs, thereby integrally controlling the respective sections of the computer. The communication I/F 24 is a network interface which is for controlling transfer to the network 13.

A server program is installed as the AP 30 on the emergency detection server 11. The server program is a program for executing the emergency detection server 11 to execute: a function of acquiring the position information from the portable terminals 12; a function of presuming occurrence of an emergency on the basis of the position information and presuming the occurrence point; a function of examining whether or not the point of the presumed occurrence corresponds to the exclusion area 17 and determining whether or not the emergency occurs at the point of the presumed occurrence; and a function of notifying the occurrence of the emergency to a predetermined destination of the notification if it is determined that the emergency occurs. The server program is, for example, registered in a startup menu of the emergency detection server 11, and is activated in accordance with activation of the emergency detection server 11.

Figure 4:
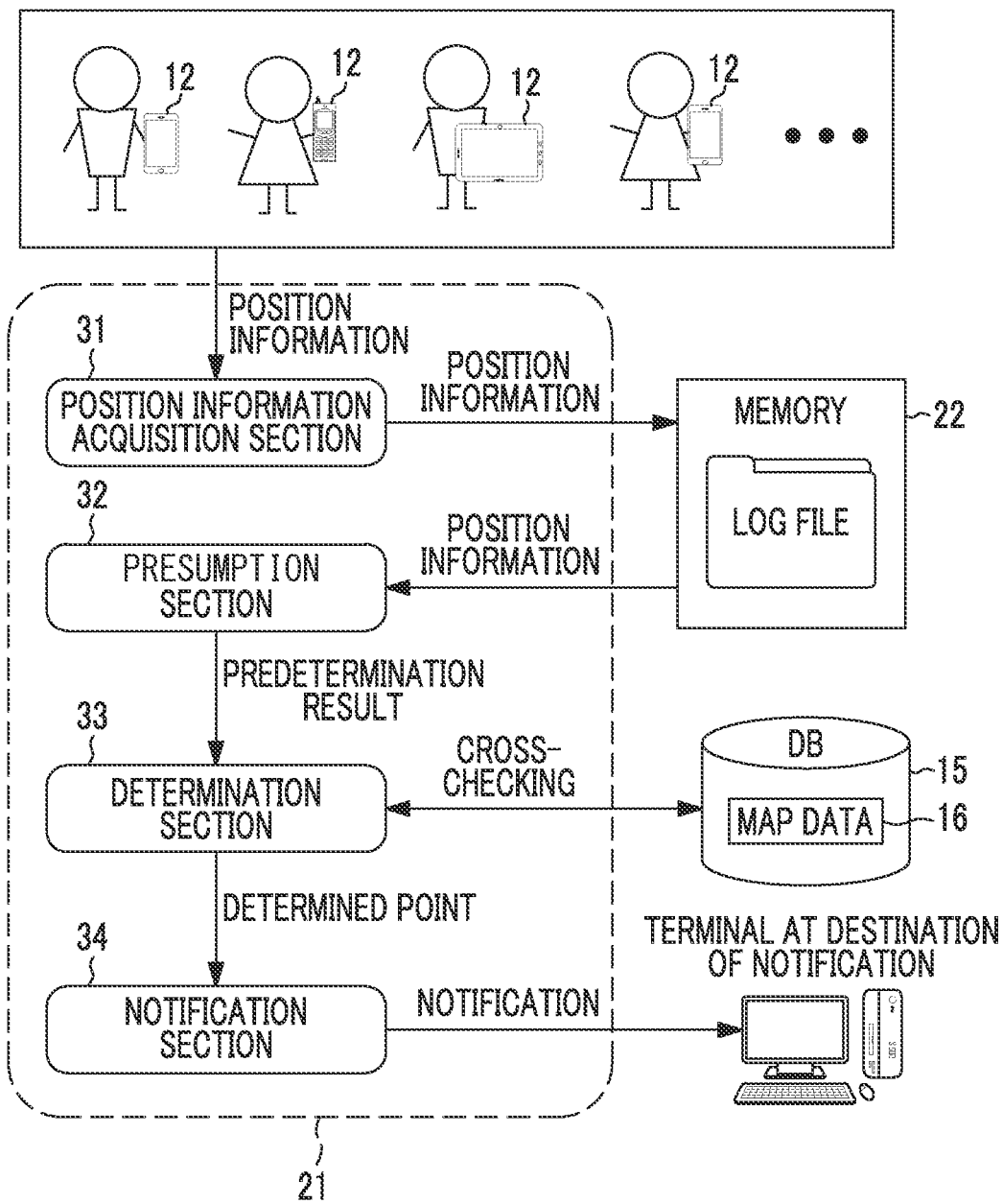
FIG. 4 is an explanatory diagram schematically illustrating functions of the emergency detection server.

As shown in FIG. 4, when the server program is activated, the CPU 21 of the emergency detection server 11 functions as a position information acquisition section 31, a presumption section 32, a determination section 33, and a notification section 34, in cooperation with the memory 22 and the like.

The position information acquisition section 31 receives information about the current position which is sent from each portable terminal 12 in real time, and collects the information for each portable terminal 12, thereby acquiring the position information, which indicates a temporal change of the current position of each portable terminal 12, for each of the portable terminals 12. The position information acquisition section 31 creates a log file for storing the position information of each portable terminal 12 acquired as described above, and stores the log file in the memory 22.

The presumption section 32 monitors the position information stored in the log file, and detects movement situations or stop situations of the portable terminals 12. Then, the presumption section 32 presumes the occurrence point where the emergency is presumed to occur, on the basis of the detected movement situations or stop situations. It should be noted that the presumption section 32 presumes the above-mentioned occurrence point (hereinafter referred to as an emergency occurrence point) through two presuming techniques of a presuming technique 1 and a presuming technique 2. Hereinafter, on a case-by-case basis, the presuming techniques will be described below in detail.

[Presuming Technique 1]

First, the presuming technique 1 will be described. The presuming technique 1 is a technique of presuming destinations of movements of the portable terminals 12, of which the number is equal to or greater than a predetermined number, as the emergency occurrence point in the case where the destinations of movements are concentrated, on the basis of the movement situations of the portable terminals 12 detected from the position information of the portable terminals 12.

Figure 5:
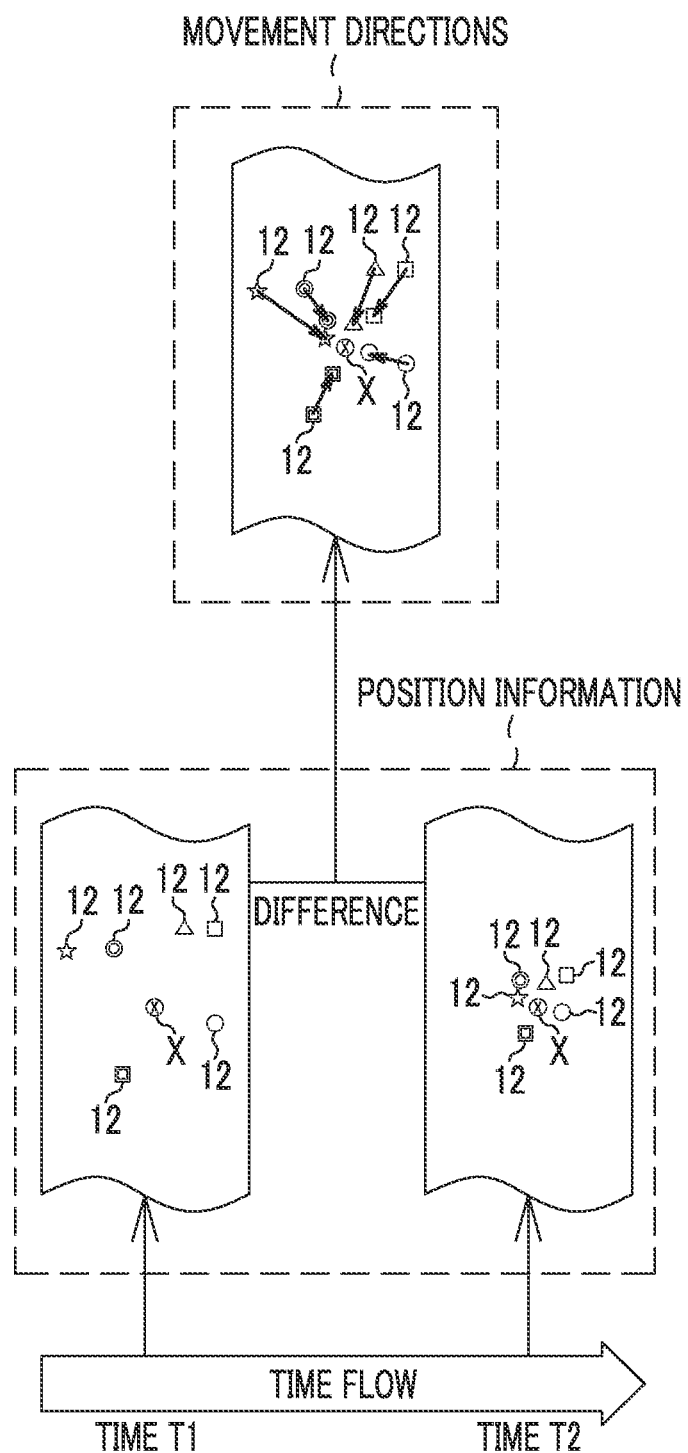
FIG. 5 is an explanatory diagram illustrating an example of an emergency occurrence point and a situation where emergency occurrence is presumed.

For example, as shown in FIG. 5, at the time T1, in the case where there is occurrence of an emergency that a pedestrian X on a sidewalk suddenly falls down on the sidewalk, a crowd gathers around the fallen pedestrian X. That is, during the time period from the time T1 at which the pedestrian X falls down to the time T2 at which people (users of the portable terminals 12) who notice the emergency and are close to the pedestrian X reach a location of the pedestrian X, the destinations of movements of the plurality of (in the example of FIG. 5, six) portable terminals 12 are concentrated at the location where the pedestrian X has fallen down. In the presuming technique 1, the concentration of the destinations of the movements is detected, and the detected destinations of the movements are presumed as an emergency occurrence point.

Figure 6:
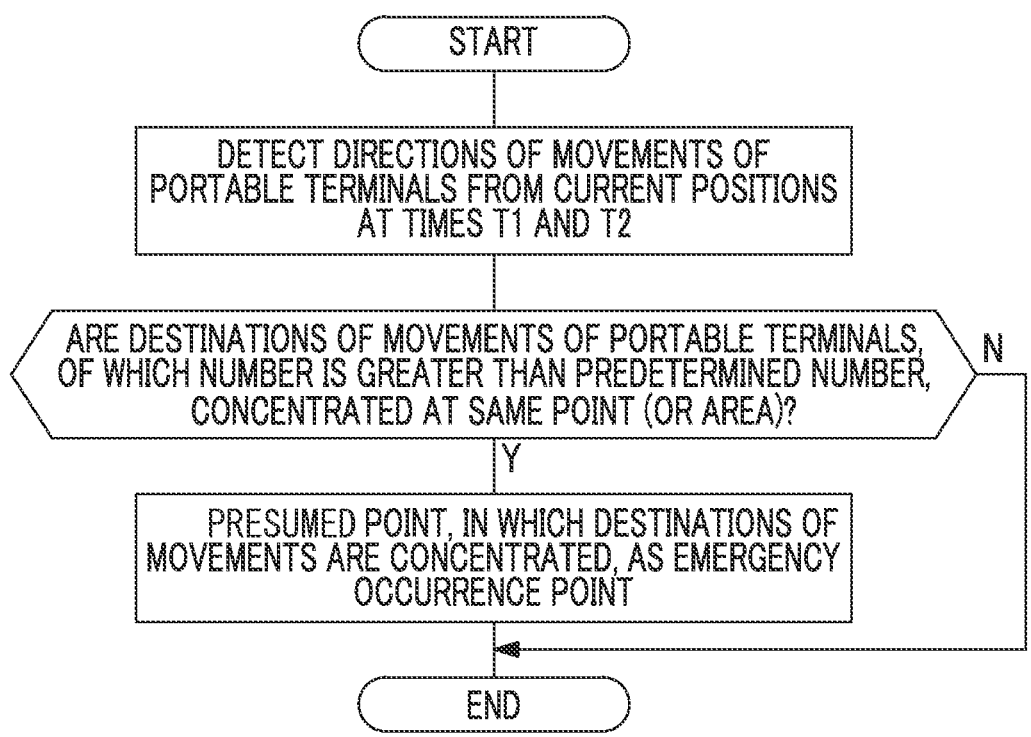
FIG. 6 is a flowchart illustrating a technique of presuming the emergency occurrence point.

Specifically, as shown in FIG. 6, the presumption section 32 detects directions of movements of the portable terminals 12 from the time T1 to the time T2 by comparing (calculating differences between) current positions of the portable terminals 12 at the time T1 and current positions of the portable terminals 12 at the time T2. Then, the directions of the movements of the portable terminals 12, of which the number is greater than a predetermined number (for example, 5), may intersect at one point (or within a comparatively small area such as an area of which a radius is 1 meter). That is, the destinations of the movements of the portable terminals 12, of which the number is greater than a predetermined number, may be concentrated at the same point (or in the same area). In this case, this point (or area) is presumed as the emergency occurrence point.

In the case where a traffic signal is changed to blue at a scramble crossing or the like, a situation where a pedestrian goes toward the center of the crossing occurs. However, this situation is not an emergency. Accordingly, the presumption section 32 may predetermine an emergency occurrence point, in consideration of not only whether or not the destinations of the movements are concentrated but also the movement directions thereof before moving toward the destinations of the movements is started, so as not to presume that this situation is an emergency.

Figure 7:
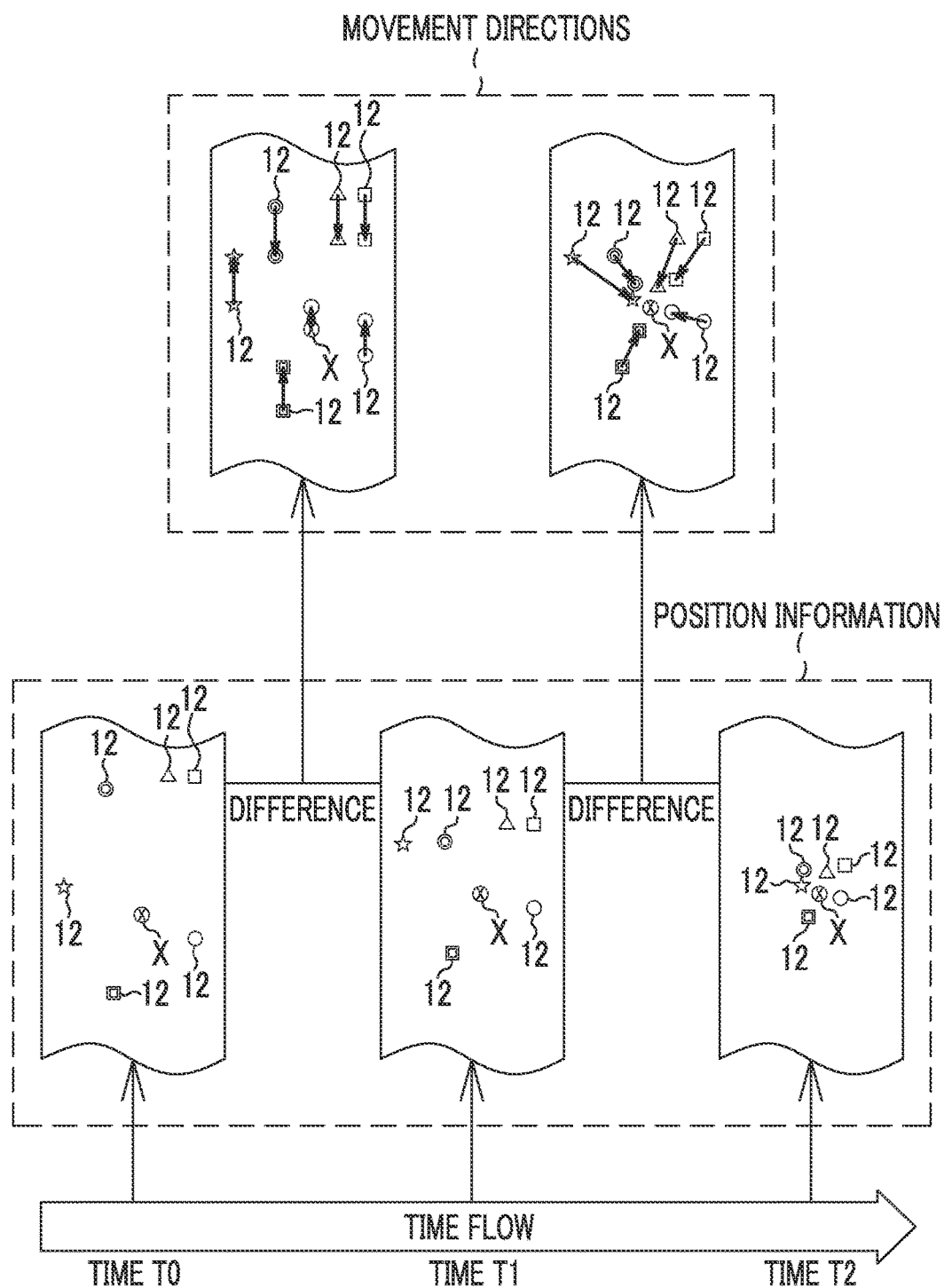
FIG. 7 is an explanatory diagram illustrating an example of an emergency occurrence point and a situation where emergency occurrence is presumed.
Figure 8:
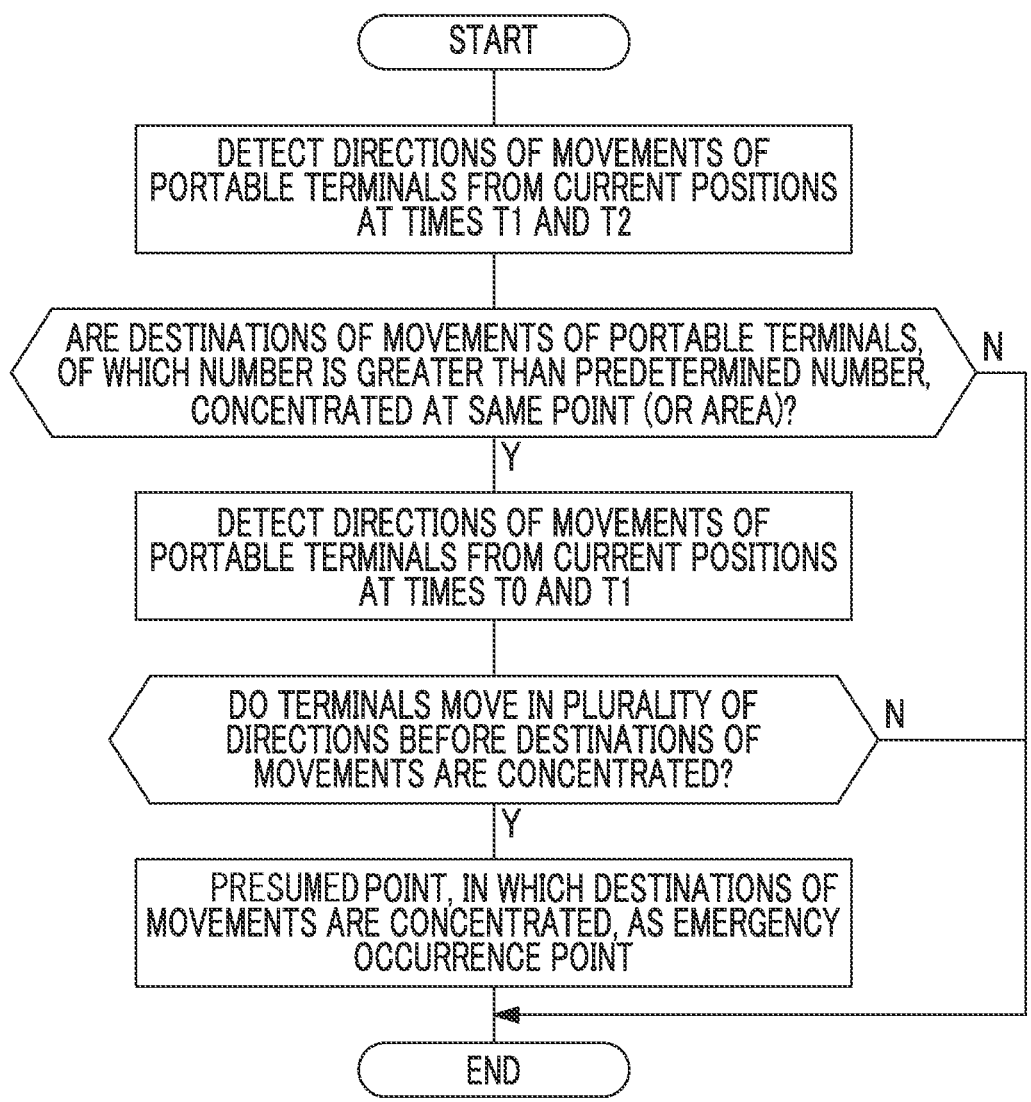
FIG. 8 is a flowchart illustrating a technique of presuming the emergency occurrence point.

In this case, for example, as shown in FIG. 7, before the destinations of the movements are concentrated, in the case where the portable terminals which are moving in random directions start moving toward a common destination of the movements at a certain time point, the destination of the movements may be presumed as the emergency occurrence point. Specifically, as shown in FIG. 8, at the time T1, in the case where it is detected that the destinations of the movements are concentrated (refer to FIGS. 5 and 6), by comparing current positions of the portable terminals 12 at the time T1 with current positions of the portable terminals 12 at the time T0 which is previous to the time T1, the directions of the movements of the portable terminals 12 from the time T0 to the time T1 are detected. Then, in the case where it is detected that the portable terminals 12 are moving in a plurality of directions, it may be presumed that a point where the destinations of the movements are concentrated is the emergency occurrence point.

Figure 9:
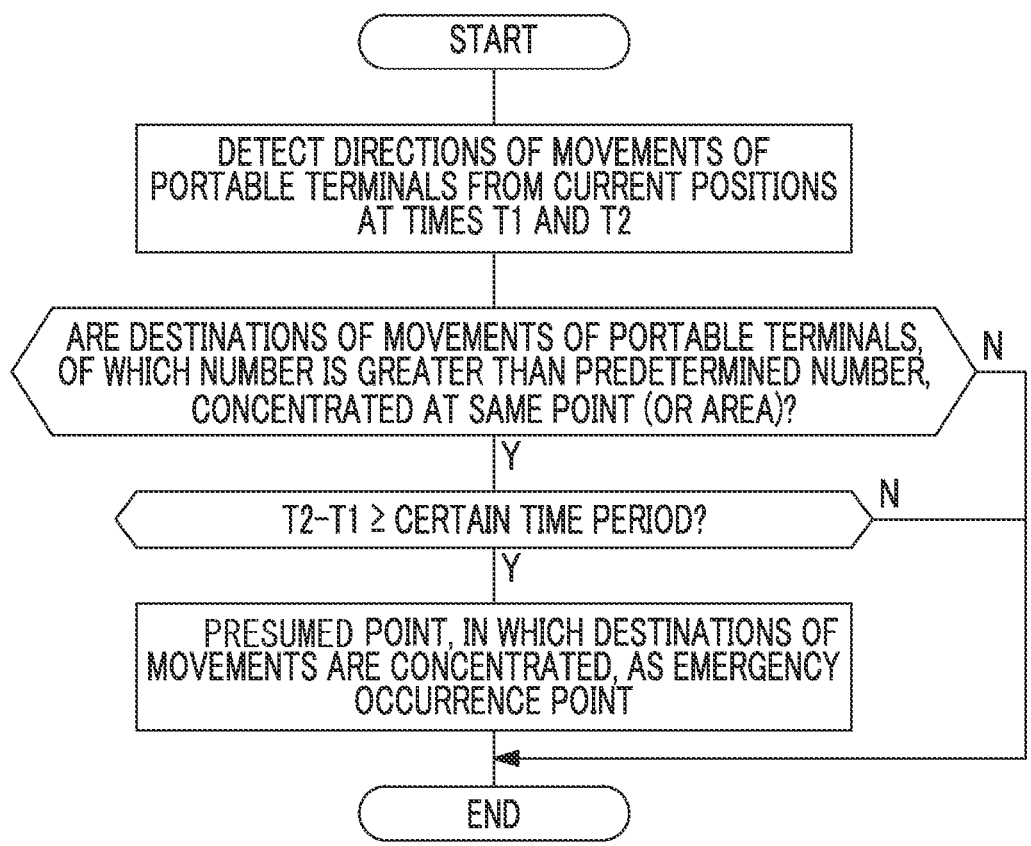
FIG. 9 is a flowchart illustrating a technique of presuming the emergency occurrence point.

As shown in FIG. 9, in the case where a situation where the destinations of the movements are concentrated at the same point (or in the same area) continues for a certain time period, that is, in FIG. 5 (or FIG. 7), in the case where the time period from the time T1 to the time T2 is equal to or greater than the certain time period, a method of presuming the destinations of the movements as the emergency occurrence point can also be considered.

Figure 10:
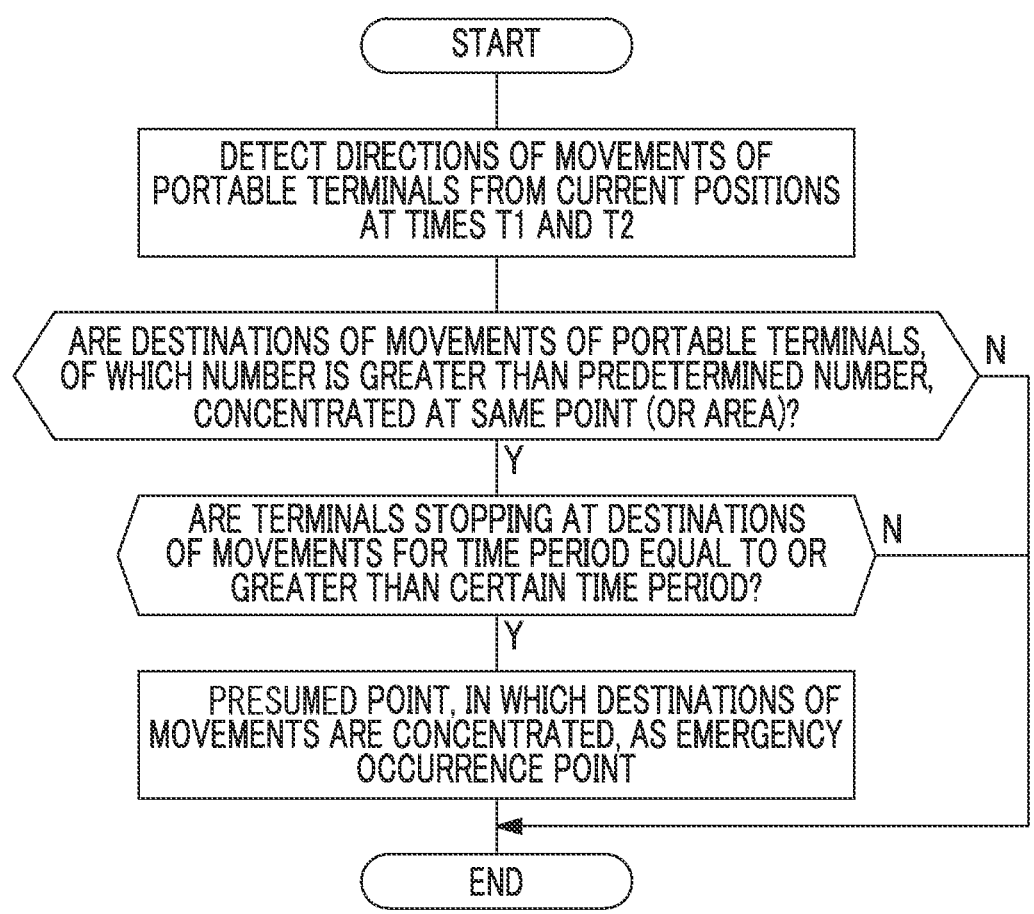
FIG. 10 is a flowchart illustrating a technique of presuming the emergency occurrence point.

As shown in FIG. 10, in the case where the plurality of portable terminals 12 is moving toward the same point (or the same area) and is thereafter stopped at the destinations of the movements for a certain time period or more, that is, in FIG. 5 (or FIG. 7), in the case where the situation at the time T2 is maintained for the certain time period or more, the method of presuming the destinations of the movements as the emergency occurrence point can also be considered.

It is apparent that the emergency occurrence point may be presumed through combination of all or some of the methods described with reference to FIGS. 5 to 10.

Whether to designate the emergency occurrence point in accordance with how many the portable terminals 12 have the same destination of the movements, that is, which value the above-mentioned predetermined number is set to, can be freely set. However, in an urban central area where a population is large, in the case where such an emergency that a person fall down occurs, it can be expected that many people are concentrated. In contrast, in a local area where a population is small, even in the case where the emergency occurs, people may be not concentrated. Hence, it is preferable that the predetermined number is determined in accordance with a population of an area subjected to the emergency detection.

[Presuming Technique 2]

Subsequently, the presuming technique 2 will be described. The presuming technique 2 is a technique of presuming a center of a set area as the emergency occurrence point in the case where the portable terminals 12 of which the number is greater than a set number in the set area are stopping for a time period greater than a set time period, on the basis of the stop situations of the portable terminals 12 detected from the position information of the portable terminals 12.

Figure 11:
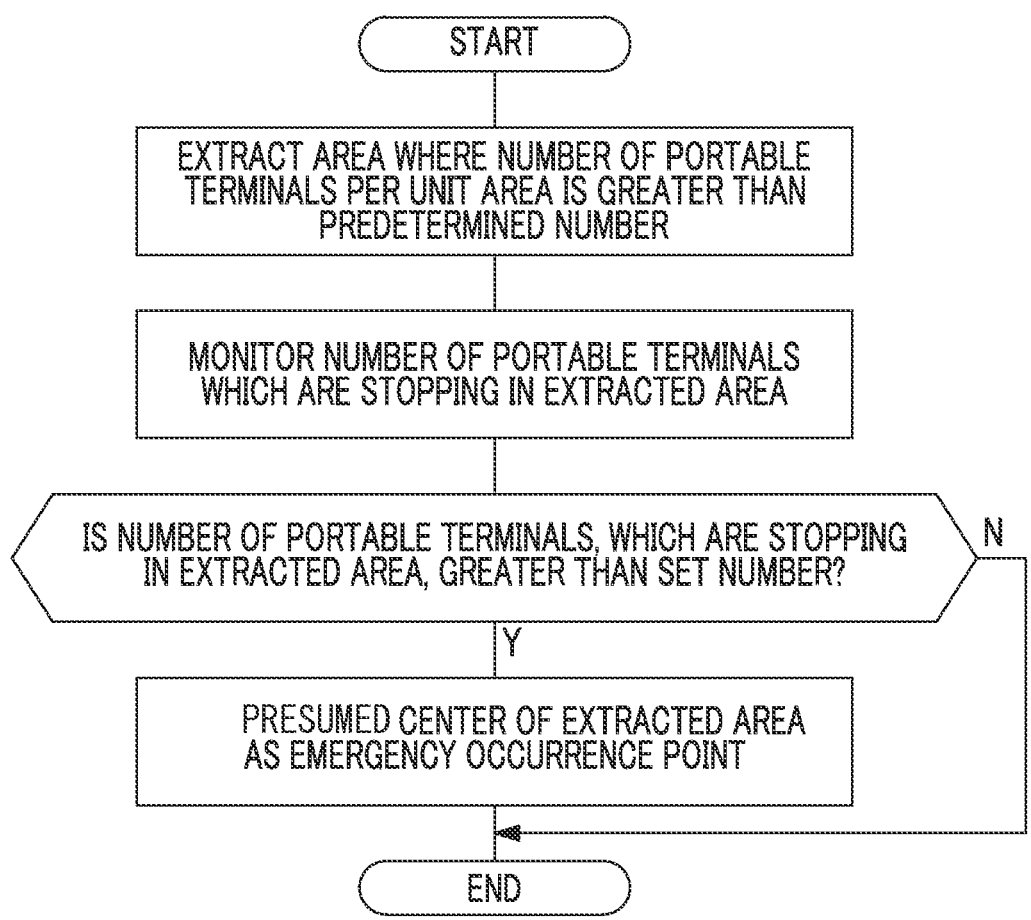
FIG. 11 is a flowchart illustrating a technique of presuming the emergency occurrence point.

As shown in FIG. 11, the presumption section 32 monitors the current positions of the portable terminals 12, and extracts an area (for example, an area of 10 m square) where the number of portable terminals 12 per unit area is greater than a preset threshold value. Subsequently, the presumption section 32 monitors the number of portable terminals 12 in a state where the portable terminals 12 are stopping for a time period equal to or greater than a set time period (for example, 1 minute), in the extracted area (set area). Then, the presumption section 32 presumes the center of the set area as the emergency occurrence point in the case where the number of portable terminals 12 is greater than a set number (for example, 50).

In the presuming technique 2, the threshold value, the size of the extracted area, the set time period, and the set number mentioned above can be freely set. Here, as described in the presuming technique 1 mentioned above, the number of people (portable terminals) gathering when an emergency occurs is different between the urban central area where the population is large and the local area where the population is small. Hence, it is preferable that such values are determined in accordance with the population of the area subjected to the emergency detection.

Returning to FIG. 4, the presumption section 32 presumes the emergency occurrence point through both above-mentioned presuming techniques 1 and 2, and notifies the emergency occurrence point and the presumed point (or area) to the determination section 33.

Figure 12:
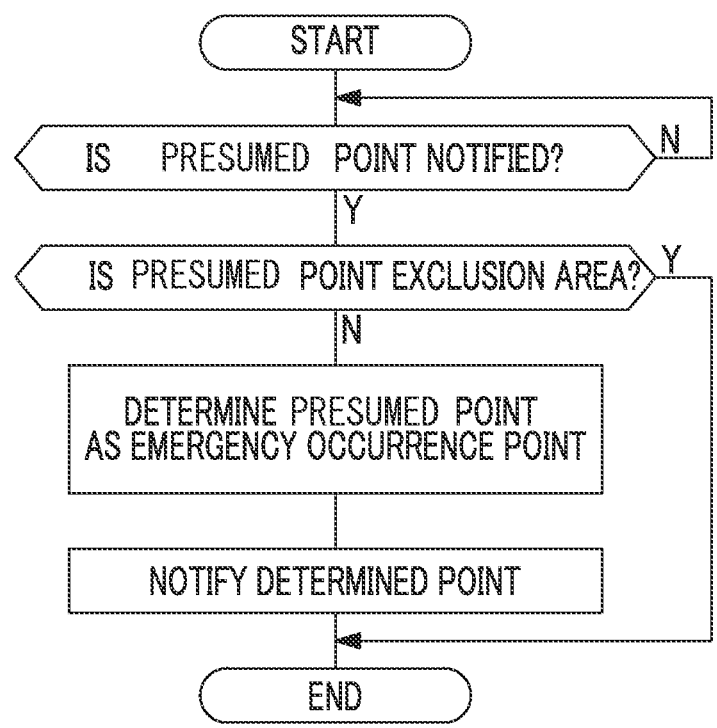
FIG. 12 is a flowchart illustrating a procedure of determining a presumed point as the emergency occurrence point.

As shown in FIG. 12, the determination section 33 examines whether or not the emergency occurrence point presumed by the presumption section 32 corresponds to the exclusion area 17 by cross-checking the emergency occurrence point presumed by the presumption section 32 with the map data 16 stored in the DB 15. Then, in the case where the point does not correspond to the exclusion area 17, the determination section 33 determines the emergency occurrence point, which is presumed by the presumption section 32, as the emergency occurrence point, and notifies the determination to the notification section 34. In addition, in the case where the point corresponds to the exclusion area 17, the point is not determined as the emergency occurrence point, and the notification to the notification section 34 is not performed.

If the determination section 33 determines the point presumed by the presumption section 32 as the emergency occurrence point, the notification section 34 is activated in response to this determination as a trigger. In accordance with the activation, the notification section 34 notifies occurrence of the emergency and the point determined as the emergency occurrence point to terminals at the preset destination of the notification. Examples of the terminals at the destination of the notification include: a terminal accessed by a police official; a terminal accessed by a fire official; a terminal accessed by a medical service worker; a terminal accessed by a regional representative; a terminal accessed by a volunteer staff who is registered in advance; and the like.

Figure 13:
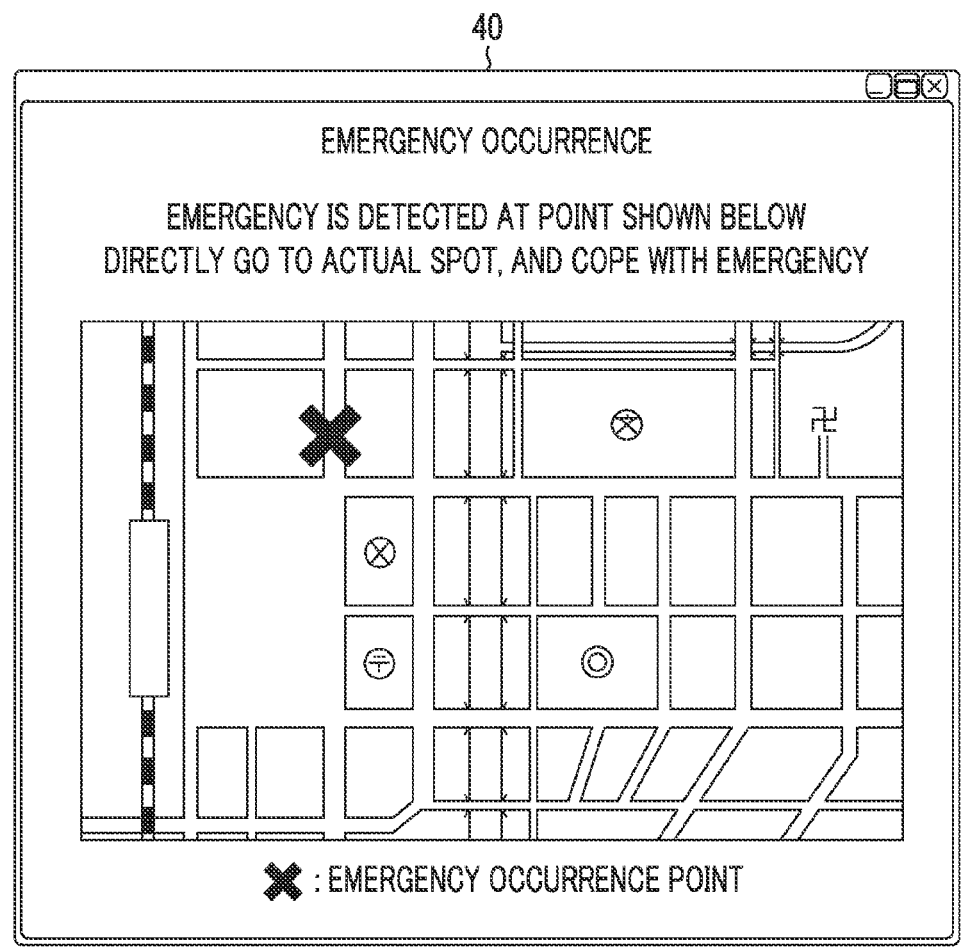
FIG. 13 is an explanatory diagram illustrating an example of a notification screen.

For example, as shown in FIG. 13, the notification is performed by transferring a message and a notification screen 40 to the terminals at the destination of the notification. The message indicates that the emergency occurs. The notification screen 40 includes a map on which the emergency occurrence point is marked. It should be noted that the notification screen 40 may be transferred in a state where it is attached to an e-mail. However, it is preferable that, like a case of emergency disaster warning, if notification is performed in cooperation with software which is installed in a terminal at the destination of the notification, the notification screen is transferred to be forcedly displayed on a display at the destination of the notification.

Hereinafter, effects of the above-mentioned configuration according to an embodiment of the present invention will be described. The emergency detection system 10 presumes occurrence of the emergency and the occurrence point on the basis of the position information of the plurality of portable terminals 12 which are obtained using a GPS. In the present embodiment, in the case where it is detected that the portable terminals 12 of which the number is equal to or greater than the predetermined number move toward the same destination of the movements, the destination of the movements is presumed as the emergency occurrence point (refer to FIGS. 5 and 6). Further, in the present embodiment, in the case where the portable terminals 12 of which the number is greater than the set number in the set area are stopping for a time period greater than the set time period, the center of the set area is presumed as the emergency occurrence point (refer to FIG. 11).

Subsequently, referring to the DB 15, the emergency detection system 10 examines whether or not the presumed point corresponds to the exclusion area 17, and determines the presumed point as the emergency occurrence point in the case where the point does not correspond to the area (refer to FIG. 11). Then, the emergency detection system 10 notifies occurrence of the emergency and the point, which is determined as the emergency occurrence point, to the terminals at the preset destination of the notification (refer to FIG. 12).

As described above, in the emergency detection system 10 of the present embodiment, on the basis of the position information of the plurality of portable terminals obtained using the GPS, the emergency is detected. Therefore, for example, as compared with a case where surveillance cameras detect the emergency, the coverage of the monitoring area (area where the emergency can be detected) is large.

In the case where the point of the occurrence of the emergency presumed does not correspond to the exclusion area 17, it is determined that the emergency occurs at the occurrence point. Hence, false detection and excess detection occur less.

As the exclusion area 17, the location where false detection and excess detection are likely to occur is set. However, as the exclusion areas 17, mostly, areas such as a police station where staff members having duty to cope with an emergency are continuously present, and areas such as a train station where staff members trained to cope with an emergency are continuously present are set. Hence, even if such areas are excluded from the monitoring area, there is almost no problem.

In the emergency detection system 10 of the present embodiment, for example, even if a person (for example, in FIG. 6, the fallen pedestrian X) causing occurrence of an emergency has no portable terminal, it is possible to detect occurrence of the emergency from the movement situations (or the stop situations) of people around the person.

The above-mentioned embodiment described, in addition to the location where people are concentrated even at normal times, the police station as an example of the location where staff members having duty to cope with an emergency even when the emergency occurs are present. However, examples of such a location also include a fire station, and medical facilities. Accordingly, as the exclusion area 17, a location other than the police station and the like may be set.

The above-mentioned embodiment described, in addition to the location where people are concentrated even at normal times, a disaster evacuation zone and a city hall as examples of the location where staff members trained to cope with an emergency even when the emergency occurs are mostly present. However examples of such a location also include an airport, government offices other than the city hall, local public organizations. Accordingly, as the exclusion area 17, a location other than the city hall and the like may be set.

It is apparent that a location set as the exclusion area 17 is not limited to the above-mentioned example, and may be appropriately changed. Therefore, it is preferable to appropriately perform update in accordance with a regional situation, a monitoring purpose, a monitoring target, and the like.

The above-mentioned embodiment described the example in which the emergency occurrence point is presumed on the basis of the directions of the movements of the plurality of portable terminals. However, in addition to the directions of the movements of the portable terminals, speeds of the movements of the portable terminals can also be obtained from the position information of the portable terminals. Accordingly, the emergency occurrence point may be presumed using the speeds. In this case, for example, the portable terminals, of which the directions of the movements are random until a certain time point, may start moving toward the same point at the certain time point, and in the case where the terminals start moving toward the same point at movement speeds higher than the movement speeds obtained when the terminals are randomly moving, the point of the destination of the movements may be presumed as the emergency occurrence point.

The above-mentioned embodiment described an example in which the exclusion area is excluded from the monitoring area. However, for example, a situation such as a meeting of friends at the meeting location may not be detected as an emergency. In this case, the following configuration may be adopted. Attribute information, which indicates attributes (an old school, a place of employment, an attending community, and the like) of users of the portable terminals, is registered in advance, or is acquired from a management site, which manages social networking service (SNS), or the like. Then, in the case where concentration of the destinations of the movements is detected as an emergency, attribute information of users concentrated at the destination of the movements is examined. Then, in the case where the destinations of the movements of users having a common attribute are concentrated, this situation is not detected as an emergency.

The present invention is not limited to the above-mentioned embodiments and the above-mentioned modification examples. It is apparent that various configurations may be adopted without departing from the scope of the present invention. For example, the above-mentioned embodiments and the above-mentioned modification examples may be appropriately combined. Further, the present invention may be also applied to, in addition to the program, a storage medium storing the program.

What is claimed is:

1. An emergency detection device comprising:
   a position information acquisition section that communicates with a plurality of portable terminals, which detect position information on the basis of radio waves sent from a GPS satellite, and acquires the position information of the plurality of portable terminals;
   a presumption section that presumes occurrence of an emergency on the basis of at least one of movement situations or stop situations of the plurality of portable terminals, the situations being detected from the position information of the plurality of portable terminals; and
   a determination section that examines whether or not a point of the occurrence of the emergency presumed by the presumption section corresponds to an exclusion area which is preset and that determines that the emergency occurs at the point of the occurrence in the case where the point of the occurrence does not correspond to the exclusion area.

2. The emergency detection device according to claim 1, wherein the presumption section presumes that the emergency occurs at destinations of movements of the portable terminals, of which the number is greater than a predetermined number, in the case where the presumption section detects, as the movement situation, a situation where the destinations of the movements are concentrated to the same point.

3. The emergency detection device according to claim 2, wherein the presumption section presumes that the emergency occurs at the destinations of the movements in the case where the presumption section detects change from a situation where the portable terminals of which the number is greater than the predetermined number respectively move in a plurality of directions to a situation where the directions are concurrently changed at a certain time point and the portable terminals start moving toward the destinations of the movements.

4. The emergency detection device according to claim 2, wherein the presumption section presumes that the emergency occurs at the destinations of the movements in the case where the presumption section detects continuance of a situation where the portable terminals of which the number is greater than the predetermined number are moving toward the destinations of the movements for a certain time period.

5. The emergency detection device according to claim 3, wherein the presumption section presumes that the emergency occurs at the destinations of the movements in the case where the presumption section detects continuance of a situation where the portable terminals of which the number is greater than the predetermined number are moving toward the destinations of the movements for a certain time period.

6. The emergency detection device according to claim 2, wherein the presumption section presumes that the emergency occurs at the destinations of the movements in the case where the presumption section detects a situation where the portable terminals of which the number is greater than the predetermined number are stopping at the destinations of the movements for a certain time period.

7. The emergency detection device according to claim 3, wherein the presumption section presumes that the emergency occurs at the destinations of the movements in the case where the presumption section detects a situation where the portable terminals of which the number is greater than the predetermined number are stopping at the destinations of the movements for a certain time period.

8. The emergency detection device according to claim 4, wherein the presumption section presumes that the emergency occurs at the destinations of the movements in the case where the presumption section detects a situation where the portable terminals of which the number is greater than the predetermined number are stopping at the destinations of the movements for a certain time period.

9. The emergency detection device according to claim 1, wherein the presumption section presumes that the emergency occurs at a center point of a preset area in the case where the presumption section detects, as the stop situation, a situation where the portable terminals of which the number is greater than a preset number are stopping in the preset area for a time period longer than a preset time period.

10. The emergency detection device according to claim 2, wherein the presumption section presumes that the emergency occurs at a center point of a preset area in the case where the presumption section detects, as the stop situation, a situation where the portable terminals of which the number is greater than a preset number are stopping in the preset area for a time period longer than a preset time period.

11. The emergency detection device according to claim 3, wherein the presumption section presumes that the emergency occurs at a center point of a preset area in the case where the presumption section detects, as the stop situation, a situation where the portable terminals of which the number is greater than a preset number are stopping in the preset area for a time period longer than a preset time period.

12. The emergency detection device according to claim 4, wherein the presumption section presumes that the emergency occurs at a center point of a preset area in the case where the presumption section detects, as the stop situation, a situation where the portable terminals of which the number is greater than a preset number are stopping in the preset area for a time period longer than a preset time period.

13. The emergency detection device according to claim 1, wherein at least one of police stations, fire stations, and medical facilities is set as the exclusion area.

14. The emergency detection device according to claim 13, wherein at least one of train stations, airports, government offices, disaster evacuation zones, and local public organizations is set as the exclusion area.

15. The emergency detection device according to claim 1, further comprising a notification section that notifies the point of the occurrence of the emergency to a preset destination of the notification.

16. The emergency detection device according to claim 15, wherein at least one of a terminal accessed by a police official, a terminal accessed by a fire official, a terminal accessed by a medical service worker, a terminal accessed by a regional representative, and a terminal accessed by a volunteer staff who is registered in advance is set as the destination of the notification.

17. The emergency detection device according to claim 15, wherein the notification section transfers a notification screen, on which the point of the occurrence of the emergency is marked on a map, to the destination of notification.

18. An emergency detection system comprising:
an emergency detection device that communicates with a plurality of portable terminals which detect position information on the basis of radio waves sent from a GPS satellite,
wherein the emergency detection device includes
a position information acquisition section that communicates with the plurality of portable terminals, and acquires the position information of the plurality of portable terminals,
a presumption section that presumes occurrence of an emergency on the basis of at least one of movement situations or stop situations of the plurality of portable terminals, the situations being detected from the position information of the plurality of portable terminals, and
a determination section that examines whether or not a point of the occurrence of the emergency presumed by the presumption section corresponds to an exclusion area which is preset and that determines that the emergency occurs at the point of the occurrence in the case where the point of the occurrence does not correspond to the exclusion area.

19. A non-transitory computer-readable recording medium that stores an emergency detection program for functioning a computer as an emergency detection device, the emergency detection program causing the computer to execute functions of:
communicating with a plurality of portable terminals, which detect position information on the basis of radio waves sent from a GPS satellite, and acquiring the position information of the plurality of portable terminals;
presuming occurrence of an emergency on the basis of at least one of movement situations or stop situations of the plurality of portable terminals, the situations being detected from the position information of the plurality of portable terminals; and
examining whether or not a point of the occurrence of the emergency presumed by the presuming corresponds to an exclusion area which is preset, and determining that the emergency occurs at the point of the occurrence in the case where the point of the occurrence does not correspond to the exclusion area.

20. A method of detecting emergency by causing an emergency detection device to execute functions of:
communicating with a plurality of portable terminals, which detect position information on the basis of radio waves sent from a GPS satellite, and acquiring the position information of the plurality of portable terminals;
presuming occurrence of an emergency on the basis of at least one of movement situations or stop situations of the plurality of portable terminals, the situations being detected from the position information of the plurality of portable terminals; and
examining whether or not a point of the occurrence of the emergency presumed by the presuming corresponds to an exclusion area which is preset, and determining that the emergency occurs at the point of the occurrence in the case where the point of the occurrence does not correspond to the exclusion area.

* * * * *